(12) United States Patent
Li et al.

(10) Patent No.: US 11,104,516 B2
(45) Date of Patent: Aug. 31, 2021

(54) ROBOT, CARRYING SYSTEM AND METHOD

(71) Applicant: Beijing Geekplus Technology Co., Ltd., Beijing (CN)

(72) Inventors: Hongbo Li, Beijing (CN); Bin Hu, Beijing (CN); Langlang Sun, Beijing (CN)

(73) Assignee: Beijing Geekplus Technology Co., Ltd., Beijing (CN)

( * ) Notice: Subject to any disclaimer, the term of this patent is extended or adjusted under 35 U.S.C. 154(b) by 280 days.

(21) Appl. No.: 16/463,822

(22) PCT Filed: Jul. 25, 2018

(86) PCT No.: PCT/CN2018/097038
§ 371 (c)(1),
(2) Date: May 23, 2019

(87) PCT Pub. No.: WO2019/109644
PCT Pub. Date: Jun. 13, 2019

(65) Prior Publication Data
US 2019/0329978 A1 Oct. 31, 2019

(30) Foreign Application Priority Data

Apr. 26, 2018 (CN) .......................... 201810390093.1
Apr. 26, 2018 (CN) .......................... 201810390950.8
Apr. 26, 2018 (CN) .......................... 201810391026.1

(51) Int. Cl.
*B65G 1/137* (2006.01)
*B65G 1/04* (2006.01)
*G05D 1/02* (2020.01)

(52) U.S. Cl.
CPC .......... *B65G 1/1373* (2013.01); *B65G 1/0492* (2013.01); *G05D 1/0295* (2013.01); *G05D 2201/0216* (2013.01)

(58) Field of Classification Search
CPC combination set(s) only.
See application file for complete search history.

(56) References Cited

U.S. PATENT DOCUMENTS 8,425,173 B2 * 4/2013 Lert ........................ B65G 47/57
414/280
9,550,624 B2 * 1/2017 Khodl ....................... B25J 5/007
(Continued)

FOREIGN PATENT DOCUMENTS

CN 105600263 5/2016
CN 106185151 12/2016
(Continued)

*Primary Examiner* — Kyle O Logan
(74) *Attorney, Agent, or Firm* — Stoel Rives LLP; R. Whitney Johnson

(57) ABSTRACT

Disclosed is a robot including a travelling apparatus, a body, a containing apparatus and an item grabbing apparatus. The travelling apparatus is disposed at a bottom of the robot and configured to automatically travel to a preset position based on a travelling path received by the robot. The body is disposed above the travelling apparatus. The containing apparatus is connected to the body and includes multiple containing positions that are interlayers stacked in a vertical direction. One of the interlayers may contain at least one target item. The item grabbing apparatus is disposed on the body and configured to, based on a task received by the robot, grab, at the preset position, a first target item from an item storage apparatus and automatically place the first target item at a containing position of the containing apparatus, or grab, at the preset position, a second target item from the containing position of the containing apparatus and automatically place the second target item in the item (Continued)

storage apparatus. A carrying system and a carrying method are further disclosed.

22 Claims, 10 Drawing Sheets

(56) References Cited

U.S. PATENT DOCUMENTS

| | | | | |
|---|---|---|---|---|
| 10,464,762 | B2* | 11/2019 | Girtman | ................ B65G 67/24 |
| 2015/0032252 | A1 | 1/2015 | Galluzzo et al. | |
| 2015/0073589 | A1 | 3/2015 | Khodl et al. | |
| 2016/0257001 | A1 | 9/2016 | Blasdel et al. | |
| 2017/0107055 | A1* | 4/2017 | Magens | ................ B66F 9/145 |
| 2017/0166399 | A1 | 6/2017 | Stubbs et al. | |
| 2017/0174431 | A1 | 6/2017 | Borders et al. | |

FOREIGN PATENT DOCUMENTS

| | | |
|---|---|---|
| CN | 107472792 | 12/2017 |
| CN | 208150248 | 11/2018 |
| CN | 208150249 | 11/2018 |
| JP | 2004277062 | 10/2004 |
| JP | 2012236683 | 12/2012 |
| JP | 2013047150 | 3/2013 |

\* cited by examiner

ROBOT, CARRYING SYSTEM AND METHOD

CROSS REFERENCE TO RELATED APPLICATIONS

This is a National Stage Application, filed under 35 U.S.C. 371, of International Patent Application No. PCT/CN2018/097038, filed on Jul. 25, 2018, which claims priorities to Chinese patent application No. 201810390950.8, filed on Apr. 26, 2018, Chinese patent application No. 201810390093.1, filed on Apr. 26, 2018 and Chinese patent application No. 201810391026.1, filed on Apr. 26, 2018, contents of which are incorporated herein by reference in their entireties.

TECHNICAL FIELD

This disclosure relates to an intelligent logistics field, for example, relates to a robot, carrying system and method.

BACKGROUND

A rapid development in e-commerce and online shopping not only brings an unprecedented development opportunity to a logistics and warehouse industry but also proposes a severe challenge to express service. In the logistics and warehouse industry, by using a traditional manual sorting method, an operator pushes a trolley with form containers, finds items corresponding to the form one by one in a warehouse according to a form (such as an order) and puts the items into the form container corresponding to the form. This sorting method requires the operator to travel a lot, which causes high labor intensity, low efficiency and high error rate.

On the basis of this, an automatic sorting system based on an intelligent carrying robot has been developed in recent years. According to a form requirement and inventory information, the robot carries a target rack with commodities corresponding to the form to a corresponding sorting station, and at the sorting station the operator sorts and places the commodities into designated containers according to prompts. When the sorting task is finished, the robot sends the rack back to a designated position. This sorting method has higher efficiency and accuracy than the manual method.

For robot carrying, the precision and stability of the rack must meet relatively high requirements, and therefore the rack in each usage scenario needs to be customized according to a size of the robot and a running environment, which leads to a higher system implementation cost. Meanwhile, for each sorting task, the entire rack needs to be carried, therefore it results in that a large number of unnecessary commodities are carried together and the robot has a low carrying efficiency and a waste of energy consumption.

SUMMARY

Embodiments of the present application provide a robot, carrying system and method to at least partially solve the problem in the related art.

An embodiment of the present application provides a robot, and the robot includes: a travelling apparatus, a body, a containing apparatus, and an item grabbing apparatus. The travelling apparatus is disposed at a bottom of the robot and configured to automatically travel to a preset position based on a travelling path received by the robot. The body is disposed above the travelling apparatus. The containing apparatus is connected to the body and includes multiple containing positions which are interlayers stacked in a vertical direction. One of the interlayers may contain at least one target item. The item grabbing apparatus is disposed on the body. based on a task received by the robot the item grabbing apparatus grabs at the preset position a first target item from an item storage apparatus and automatically places the first target item at a containing position of the containing apparatus, or grabs at the preset position a second target item from the containing position of the containing apparatus and automatically places the second target item in the item storage apparatus.

An embodiment of the present application provides a carrying system, and the carrying system includes a first robot and a second robot. The first robot is configured to move to an item storage apparatus, and grab a first target item in the item storage apparatus and place the first target item on a movable temporary cache apparatus or grab a second target item on the movable temporary cache apparatus and place the second target item in the item storage apparatus. The second robot is connected to the temporary cache apparatus and moves along with the first robot.

By using the robot, the carrying system and method provided by embodiments of the present application, the robot is automatically transported to a preset destination through the travelling apparatus, and the target items grabbed by the item grabbing apparatus can be carried and transported by using the containing apparatus (including one or more containing positions) of the robot. Compared with the traditional way of carrying the entire rack, the robot may selectively grab any storage container on the rack to be transported instead of the entire rack, thereby improving the hit rate of the item sorting and improving the carrying efficiency of the storage container.

DETAILED DESCRIPTION

Embodiments of the present application are described below in combination with the drawings. The embodiments described herein are only part, not all, of the embodiments of the present application.

Figure 1:
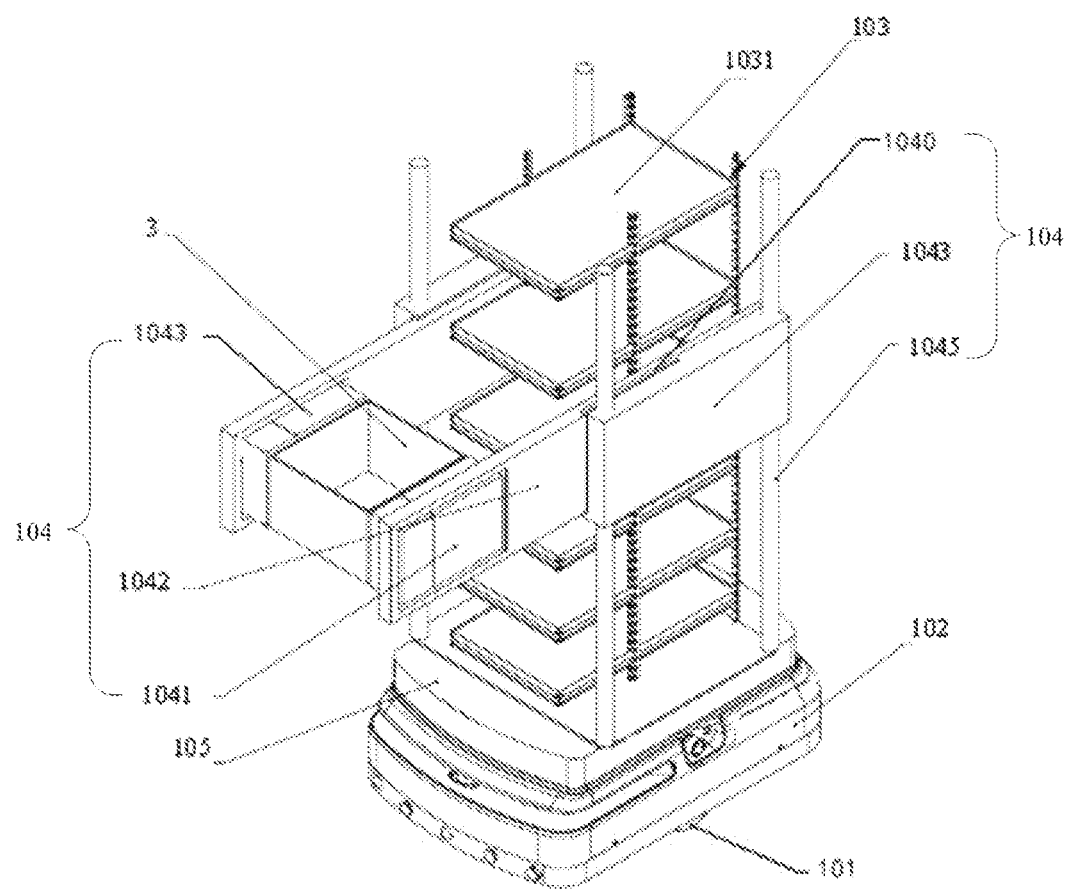
FIG. 1 is a schematic diagram of a robot according to an embodiment of the present application.

Referring to FIG. 1, an embodiment of the present application provides a robot (such as a carrying device used for description below) including a travelling apparatus 101, a body 102, a containing apparatus 103 and an item grabbing apparatus 104.

The travelling apparatus 101 is a moving component of the carrying device. As an example, the travelling apparatus 101 may include one or more wheels, and the carrying device is moved through the rolling of wheel(s). The travelling apparatus 101 may be disposed at a bottom or other parts of the carrying device.

The carrying device can communicate with a backend server in a wired manner or a wireless manner. By communicating with the backend server, the carrying device can obtain an item carrying task, and the carrying task includes a travelling path (which includes one or more coordinate points) and a specific ID identifier (such as a serial number of an item) of a target item, which are allocated to the carrying device. Based on the travelling path of the carrying device, the travelling apparatus 101 automatically travels to a preset position at which the target item is located or a working area is located.

The body 102 is an integral supporting component of the carrying device. As a situation, the body 102 is disposed above the travelling apparatus 101 and configured to support the carrying device.

For the convenience of carrying items, the carrying device is provided with the containing apparatus 103 for placing one or more items. The containing apparatus 103 is disposed above the body 102. The containing apparatus 103 includes a plurality of containing positions 1031. For example, the containing positions 1031 are interlayers stacked in a vertical direction and each interlayer may contain at least one target item.

After transporting the carrying device to the preset position, the travelling apparatus 101 automatically grabs the target item through the item grabbing apparatus 104. For example, in a sorting scenario, based on an item grabbing task received by the carrying device, the item grabbing apparatus 104 grabs the target item from an item storage apparatus corresponding to the preset position and automatically places the grabbed target item at a containing position 1031 of the containing apparatus 103 (such as placing in any interlayer of the containing apparatus). For example, in a restocking scenario, based on the item grabbing task received by the carrying device, the item grabbing apparatus 104 grabs the target item from the containing position 1031 of the containing apparatus 103 (such as any interlayer of the containing apparatus) and places the grabbed target item in the item storage apparatus corresponding to the preset position.

As a situation, multiple target items may be indicated to be carried from the item carrying task received by the carrying device, and the carrying device obtains the multiple target items from one or more item storage apparatuses according to the travelling path. The travelling path may be notified to the carrying device by the backend server after planned by the backend server or may be determined after planned by the carrying device itself.

Figure 2:
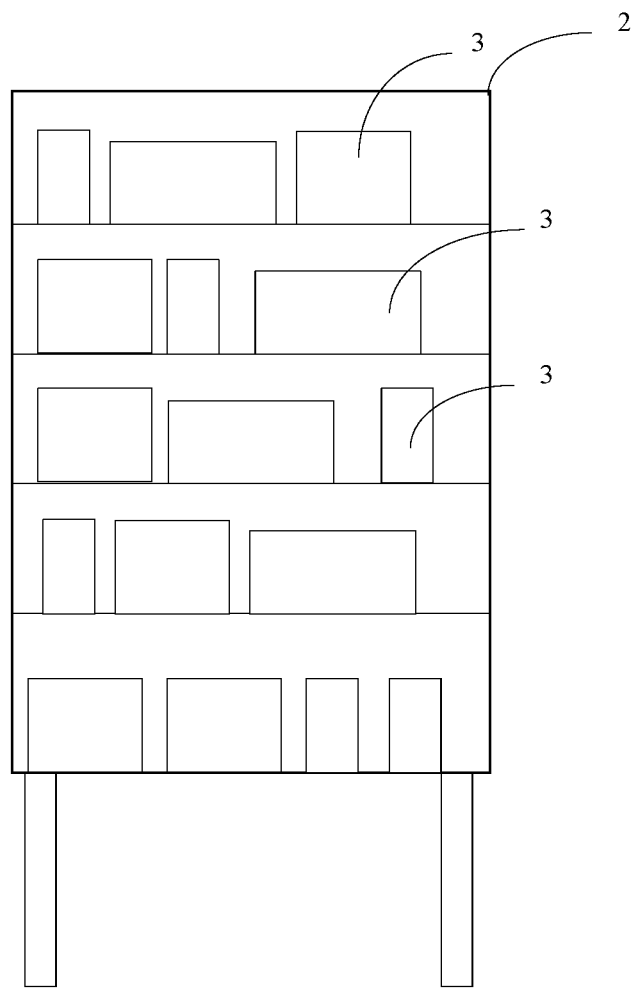
FIG. 2 is a schematic diagram of an item storage apparatus according to an embodiment of the present application.

The item storage apparatus may be any apparatus that can store items. As an example, referring to FIG. 2, the item storage apparatus may be a rack 2. FIG. 2 is a schematic diagram of an item storage apparatus provided by an embodiment of the present application and the rack 2 stores items 3. In an embodiment, the rack 2 includes a plurality of interlayers, and each of the interlayers can contain one or more items 3. The items 3 may be commodities on the rack or storage containers, each of which is capable of storing one or more goods, on the rack.

In addition, in an embodiment, the items 3 may also be hung on a hook or a rod on the rack 2 or within the rack 2. The items 3 can be placed within the rack or on an outside surface of the rack in any appropriate manner. The rack 2 may be carried by the carrying device in a rolling, carrying or another manner. In order to carry the rack 2 easily by the carrying device, the rack 2 includes one or more rack supporting portions and a rack identification point for identifying the identity of the rack. An item storage system may include any appropriate number of racks.

The item 3 represents any item stored, sorted or transported in an automatic inventory, warehouse, manufacturing and/or parts processing system. The item 3 may be any materials. The item 3 may be a living or inanimate object. As an example, the item 3 may represent an item of a commodity stored in the warehouse. The carrying device may retrieve a designated rack 2 including a specific item 3 that is associated with a customer order to be packaged, so as to deliver to a customer or other parties.

As another example, the item 3 may represent a luggage stored in a luggage facility of an airport. The carrying device may take back a rack 2 including the luggage to be transported or tracked, which may include selecting a specific luggage item used for an explosive screening, moving luggage items associated with a flight that has converted the gate, or removing a luggage item belonging to a passenger who has missed the flight.

As another example, the item 3 may denote each of components in a manufacturing toolkit. In an embodiment, these components may denote components which are planned to be included in an assembled product, such as computer components used for customizing a computer system. In such an embodiment, the carrying device may retrieve the specific components identified by specifications related to the customer order.

As another example, the item 3 may represent a person. For example, in a hospital environment, the rack 2 may denote a bed for a specific patient. Therefore, the item storage system may be configured to provide a safe and effective system used for moving the hospital bed, which limits the probability of patient injury and reduces the probability of errors due to human errors. In short, the item 3 may be any appropriate item suitable for being stored in the rack 2 in any appropriate manner.

The item grabbing apparatus 104 may be implemented by using multiple manners. Referring to FIG. 1, according to an implementation mode of an embodiment of the present application, the item grabbing apparatus 104 includes a telescopic component 1042 which grabs a target item from the item storage apparatus. Referring to FIG. 1, to cooperate with the telescopic component 1042, the item grabbing apparatus 104 may further include a telescopic supporting piece 1043 which is configured to support the telescopic component 1042.

The target items in the item storage apparatus are usually different in height. According to an implementation mode of an embodiment of the present application, in order to place the target items with different heights at the containing positions, the item grabbing apparatus 104 includes a lifting component 1045 which lifts and/or lowers the telescopic component 1042 to a height that matches with the target item. The lifting components 1045 may be any apparatus capable of lifting in height. As an alternative implementation mode, the lifting component may be a linear bearing.

The telescopic component 1042 may grab the item(s) in multiple manners. Referring to FIG. 1, according to an implementation mode of an embodiment of the present application, the telescopic component 1042 includes a clamping portion 1041, and the clamping portion 1041 grabs, in a clamping manner, the target item from the item storage apparatus or from a containing position of the containing apparatus. The telescopic component 1042 further includes a sliding portion 1040, the sliding portion 1040 is connected to the clamping portion 1041, and the clamping portion 1041 slides in a depth direction of the interlayers through the sliding portion 1040. As an alternative implementation mode, the sliding portion 1040 may be a guide rail.

According to an implementation mode of an embodiment of the present application, referring to FIG. 1, the clamping portion 1041 includes two grippers: a first gripper and a second gripper that are relatively disposed on a left side and a right side of the interlayers. The two grippers may be a plate like structure or other shape structures, such as a rod-shaped structure. The plate like structure may be in the shape of a rectangle (including a square) or a circle or in other shapes. The heights of the first gripper and the second gripper may match with the height of the interlayers. In an embodiment, the height of each of the first gripper and the second gripper is less than or equal to the height of the interlayers.

The clamping portion further includes fasteners 1043 disposed respectively on an inner side vii of the first gripper and an inner side of the second gripper. The fasteners 1043 may be folded. When the clamping portion 1041 does not grab the target item, the fasteners 1043 are folded. When the clamping portion 1041 grabs the target item, the fasteners 1043 are opened. The fasteners 1043 are configured to fasten the target item when grabbing the target item to prevent the target item from sliding between the first gripper and the second gripper.

Figure 3:
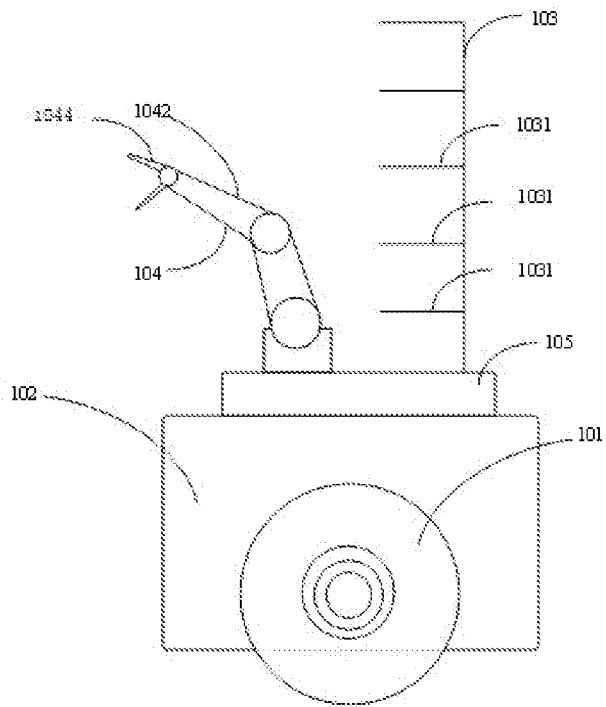
FIG. 3 is a schematic diagram of another robot according to an embodiment of the present application.

According to another implementation mode of an embodiment of the present application, in addition to grabbing the target item in the clamping manner, referring to FIG. 3, the telescopic component 1042 includes a gripper portion 1044 which grabs by a gripper the target item from the item storage apparatus or from a containing portion of the containing apparatus. The gripper portion 1044 is set as a contraction state when the carrying device does not execute the task and set as an open state when the carrying device executes the task.

As shown in FIG. 1, according to another implementation mode of an embodiment of the present application, the lifting component 1045 executes a scaling operation based on a height of the target item. The lifting component 1045 is lifted in height when executing an open operation and the lifting component 1045 is lowered in height when executing a contraction operation.

According to another implementation mode of an embodiment of the present application, the telescopic component 1042 includes a forking portion that grabs the target item from the item storage apparatus corresponding to the preset position in a forking manner. The forking portion may be implemented by using various mechanical structures with forking functions and details are not described herein.

In the process of grabbing the item, the item grabbing apparatus 104 may adjust a posture based on an actual need. Referring to FIGS. 1 and 3, according to an implementation mode of an embodiment of the present application, the carrying device further includes a rotating component 105, and the containing apparatus 103 and the item grabbing apparatus 104 are disposed on the rotating component 105.

According to an implementation mode of an embodiment of the present application, the lifting component 1045 and the rotating component 105 are automatically adjusted to a posture that matches with grabbing the target item during the carrying device moving from a task starting point to the preset position. In this way, the carrying device is enabled to automatically adjust the posture well before grabbing the target item, thereby reducing the time for grabbing the target item.

As an example, when picking up the target item (e.g., goods), the carrying device travels to a preset position by scheduling. in the process of travelling, the rotating component 105 and the lifting component 1045 cooperate to rotate the rack on the carrying device by 90°. The rotating viii direction of the rack depends on the position direction of the grabbed goods (such as the target item), and the lifting or lowering height of the lifting component 1045 depends on the position height of the grabbed goods. Then the telescopic component 1042 works. The telescopic component 1042 extends to make the clamping portion 1041 be extended to a position corresponding and coupled to a material box storing the grabbed goods, and then the clamping portion 1041 clamps the material box storing the goods. Then the lifting component 1045 works and lifts the material box of the item. The telescopic component 1042 works and quickly places the item in the interlayer of the rack at a corresponding height of the goods. The carrying device receives a system instruction and goes to a next position. During the travelling process of the carrying device, the rotating component 105 works at the same time, so that the forward direction of the rack is aligned with that of the carrying device. Then, one or more components work and place the material box storing the goods in the interlayer of the rack scheduled by the system, during which the carrying device is on the way to the next pick-up site.

The item grabbing apparatus 104 provided by the present application may take out two or more target items, place the target items on the item storage apparatus and transport the multiple target items together to the designated site, to maximize the efficiency.

The carrying device provided by an embodiment of the present application is automatically transported to the preset destination through a travelling apparatus, and the carrying device can bear and carry the target items grabbed by the item grabbing apparatus by using one or more containing positions disposed above the body. Compared with the traditional way of carrying the entire rack, the robot may selectively grab a storage container for loading goods or the goods on the rack to be transported instead of the entire rack, thereby improving the hit rate of item sorting.

Figure 4:
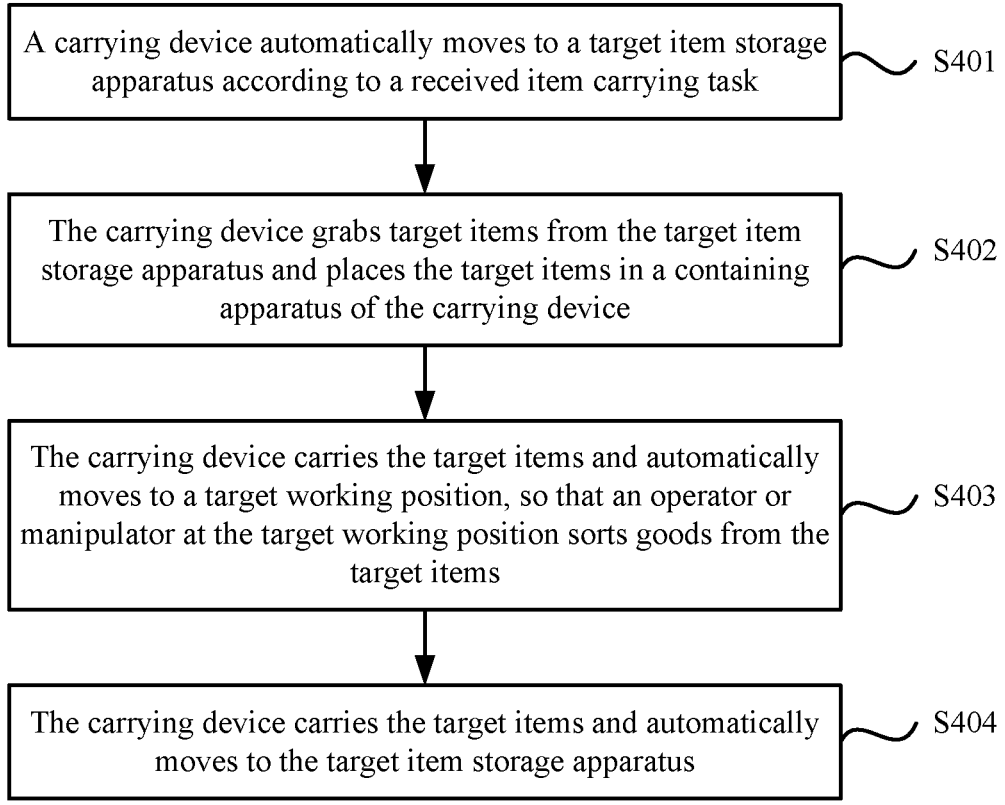
FIG. 4 is a flowchart of a carrying method based on a sorting scenario according to an embodiment of the present application.

Corresponding to the above carrying device and by using the carrying device provided by the above embodiments, referring to FIG. 4, an embodiment of the present application provides a sorting method based on a sorting scenario, and the method includes steps described below.

In S401, the carrying device automatically moves to a target item storage apparatus according to a received item carrying task.

In S402, the carrying device grabs target items from the target item storage apparatus and places the target items in a containing apparatus of the carrying device.

The target item may be a storage container. The carrying device may communicate with a backend server, and the communication manner may be a wired manner or a wireless manner. By communicating with the backend server, the carrying device can obtain an item carrying task including a travelling path (including one or more coordinate points) allocated to the carrying device and a specific ID identifier of a target item (such as a serial number of an item, etc.). According to the ID identifier of the target item, the carrying device identifies a target item to be grabbed from the target item storage apparatus and grabs the target item. In addition, each interlayer of the target item storage apparatus may be respectively provided with an interlayer ID identifier. According to the interlayer ID identifier, the carrying device may further determine which interlayer of the target item storage apparatus the height of the item grabbing apparatus reaches, thereby grabbing the target item from the preset interlayer of the target item storage apparatus. In this case, the item carrying task further includes the interlayer ID identifier.

The containing apparatus of the carrying device carries the target item. The containing apparatus includes multiple containing positions that are interlayers stacked in a vertical direction. One of the interlayers may contain at least one target item. Each interlayer of the containing apparatus may also be respectively provided with the interlayer ID identifier. Through the interlayer ID identifier, the carrying device may determine which interlayer of the containing apparatus the height of the item grabbing apparatus reaches, thereby placing the target item in the preset interlayer of the containing apparatus.

In S403, the carrying device carries the target items and automatically moves to a target working position, so that an operator or manipulator at the target working position sorts goods from the target items.

At the target working position, the operator or manipulator grabs goods from the target items, where the goods are goods to be sorted. The grabbed goods may be placed into an order container and the goods in one order container may be the goods for an order.

In S404, the carrying device carries the target items and automatically moves to the target item storage apparatus.

As a situation, multiple target items may be indicated to be handled from the item carrying task received by the carrying device may indicate that multiple target items are carried, and the carrying device obtains the multiple target items from one or more item storage apparatuses according to a plan for the travelling path.

It should be understood that, in addition to the sorting scenario, the carrying device of the embodiment of the present application may also be applied to a restocking method in a restocking scenario. In S403, the operator or manipulator at the target working position places the goods in the target items, in which the goods are goods needed to be restocked in the target items.

By using the sorting method provided by the embodiments of the present application, the carrying device is automatically transported to a preset destination through a travelling apparatus. The target items grabbed by the item grabbing apparatus can be carried and transported by using one or more containing positions disposed on the carrying device. Compared with the traditional way of carrying the entire rack, the carrying device may selectively grab a storage container for loading goods on the rack needed to be transported or goods instead of the entire rack, thereby improving the hit rate of the item sorting.

Figure 5:
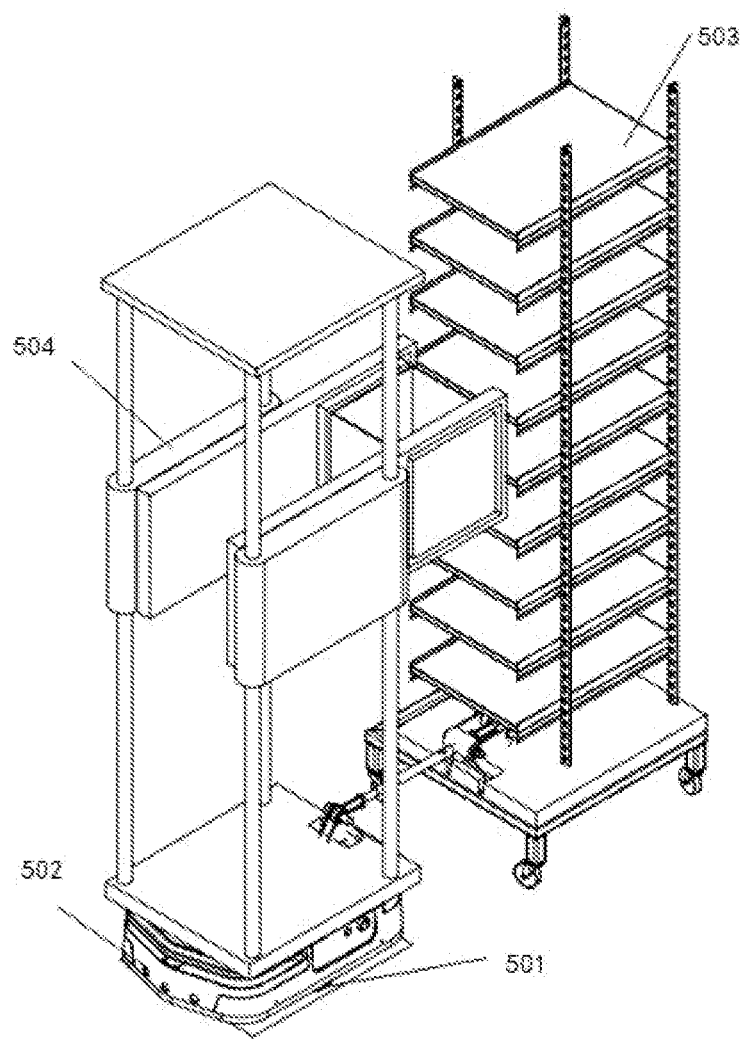
FIG. 5 is a schematic diagram of another robot according to an embodiment of the present application.

Referring to FIG. 5, an embodiment of the present application provides a robot (such as a carrying device used for description below) including a travelling apparatus 501, a body 502, a containing apparatus 503 and an item grabbing apparatus 504.

The travelling apparatus 501 is a moving component of the carrying device, and as an example, the travelling apparatus 501 may include one or more wheels through the rolling of which the carrying device is moved. The travelling apparatus 501 may be disposed at a bottom of the carrying device. In an embodiment, the travelling apparatus 501 may also be disposed at other parts of the carrying device.

The carrying device can communicate with a backend server in a wired manner or a wireless manner. By communicating with the backend server, the carrying device can acquire an item carrying task which includes a travelling path (including one or more coordinate points) allocated to the carrying device and a specific ID identifier (such as a serial number of an item) of a target item. Based on the travelling path of the carrying device, the travelling apparatus 501 automatically travels to a preset position. The preset position may be a place at which the target item is located or a working area is located. The operator in the working area may perform sorting operations on the target items.

The body 502 is an integral supporting component of the carrying device. As a situation, the body 502 is disposed above the travelling apparatus 501 and configured to support the item grabbing apparatus 504.

To carry items easily, the body 502 of the carrying device is connected to the containing apparatus 503 including multiple containing positions. For example, the containing positions are interlayers stacked in a vertical direction and each interlayer may contain at least one target item.

A roller is disposed at the bottom of the containing apparatus 503 so that the containing apparatus 503 may move along with the travelling apparatus 501 when the travelling apparatus 501 moves. In an alternative solution, each of four corners at the bottom of the containing apparatus 503 is provided with a roller respectively.

After the traveling apparatus 501 transports the carrying device to the preset position, the target item is automatically grabbed by the item grabbing apparatus 504. For example, in a sorting scenario, based on an item grabbing task received by the carrying device, the item grabbing apparatus 504 grabs a target item from an item storage apparatus corresponding to the preset position, and automatically places the grabbed target item at a containing position of the containing apparatus 503 (such as places at any interlayer of the containing apparatus). For example, in a restocking scenario, based on an item grabbing task received by the carrying device, the item grabbing apparatus 504 grabs a target item from a containing position of the containing apparatus 503 (such as from any interlayer of the containing apparatus) and places the grabbed target item in the item storage apparatus corresponding to the preset position.

As a situation, the item carrying task received by the carrying device may indicate carrying multiple target items, and the carrying device obtains the multiple target items from one or more item storage apparatuses according to the travelling path. The travelling path may be planned and notified to the carrying device by the backend server or may be planned and determined by the carrying device itself.

The item storage apparatus may be any apparatus that can store items. As an example, referring to FIG. 2, the item storage apparatus may be a rack 2. The rack 2 stores items 3. In an embodiment, the rack 2 includes a plurality of interlayers, and each of the interlayers can contain one or more items 3. The items 3 may be commodities on the rack or storage containers, each of which is capable of storing one or more goods, on the rack.

In addition, in an embodiment, the items 3 may also be hung on a hook or a rod on the rack 2 or within the rack 2. The items 3 can be placed within the rack or on an outside surface of the rack in any appropriate manner. The rack 2 may be carried by the carrying device in a rolling, carrying or another manner. In order to carry the rack 2 easily by the carrying device, the rack 2 includes one or more rack supporting portions and a rack identification point for identifying the identity of the rack. An item storage system may include any appropriate number of racks.

The item 3 represents any item stored, sorted or transported in an automatic inventory, warehouse, manufacturing or parts processing system. The item 3 may be any materials. The item 3 may be a living or inanimate object. As an example, the item 3 may represent an item of a commodity stored in the warehouse. The carrying device may retrieve a designated rack 2 including a specific item 3 that is associated with a customer order to be packaged, so as to deliver to a customer or other parties.

As another example, the item 3 may represent a luggage stored in a luggage facility of an airport. The carrying device may take back a rack 2 including the luggage to be transported or tracked, which may include selecting a specific luggage item used for an explosive screening, moving luggage items associated with a flight that has converted the gate, or removing a luggage item belonging to a passenger who has missed the flight.

As another example, the item 3 may denote each of components in a manufacturing toolkit. In an embodiment, these components may denote components which are planned to be included in an assembled product, such as computer components used for customizing a computer system. In such an embodiment, the carrying device may retrieve the specific components identified by specifications related to the customer order.

As another example, the item 3 may represent a person. For example, in a hospital environment, the rack 2 may denote a bed for a specific patient. Therefore, the item storage system may be configured to provide a safe and effective system used for moving the hospital bed, which limits the probability of patient injury and reduces the probability of errors due to human errors. In short, the item 3 may be any appropriate item suitable for being stored in the rack 2 in any appropriate manner.

Figure 6:
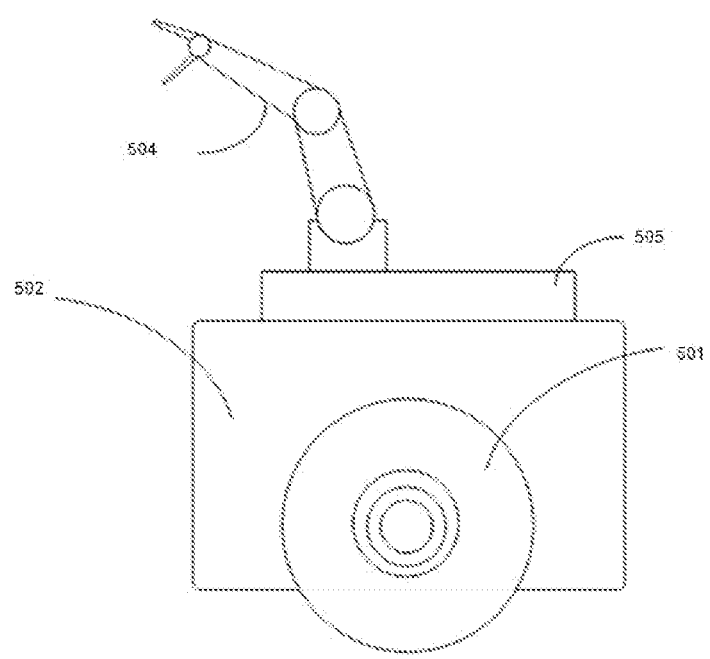
FIG. 6 is a schematic diagram of another robot according to an embodiment of the present application.

The item grabbing apparatus 504 may be implemented by using multiple manners. Referring to FIGS. 5 and 6, according to an implementation mode of an embodiment of the present application, the item grabbing apparatus 504 includes a telescopic component which grabs a target item from the item storage apparatus. To cooperate with the telescopic component, the item grabbing apparatus 504 may further include a telescopic supporting piece which is configured to support the telescopic component.

The target items on the item storage apparatus are usually different in height. According to an implementation mode of an embodiment of the present application, in order to place the target items with different heights at the containing positions, the item grabbing apparatus 504 includes a lifting component which lifts or lowers the telescopic component to a height that matches with the target item. The lifting components may be any apparatus capable of lifting in height. As an alternative implementation mode, the lifting component may be a linear bearing.

The telescopic component may grab the item(s) in multiple manners. Referring to FIG. 5, according to a detailed implementation mode of an embodiment of the present application, the telescopic component includes a clamping portion, and the clamping portion grabs, in a clamping manner, the target item from the item storage apparatus or from a containing position of the containing apparatus. The telescopic component further includes a sliding portion, the sliding portion is connected to the clamping portion, and the clamping portion slides in a depth direction of the interlayers through the sliding portion. As an alternative implementation mode, the sliding portion may be a guide rail.

According to an implementation mode of an embodiment of the present application, the clamping portion includes two grippers: a first gripper and a second gripper that are relatively disposed on a left side and a right side of the interlayers. The two grippers may be a plate like structure or other shape structures, such as a rod-shaped structure. The plate like structure may be in the shape of a rectangle (including a square) or a circle or in other shapes. The heights of the first gripper and the second gripper may match with the height of the interlayers. In an embodiment, the height of each of the first gripper and the second gripper is less than or equal to the height of the interlayers.

The clamping portion further includes fasteners disposed respectively on an inner side of the first gripper and an inner side of the second gripper. The fasteners may be folded. When the clamping portion does not grab the target item, the fasteners are folded. When the clamping portion grabs the target item, the fasteners are opened. The fasteners are configured to fasten the target item when grabbing the item to prevent the target item from sliding between the first gripper and the second gripper.

According to another implementation mode of an embodiment of the present application, in addition to grabbing the target item in the clamping manner, the telescopic component includes a gripper portion which grabs by a gripper the target item from the item storage apparatus or from a containing portion of the containing apparatus. The gripper portion is set as a contraction state when the carrying device does not execute the task and set as an open state when the carrying device executes the task.

According to another implementation mode of an embodiment of the present application, the lifting component executes a scaling operation based on a height of the target item. The lifting component is lifted in height when executing an open operation and the lifting component is lowered in height when executing a contraction operation.

According to another implementation mode of an embodiment of the present application, the telescopic component includes a forking portion that grabs the target item from the item storage apparatus corresponding to the preset position in a forking manner. The forking portion may be implemented by using various mechanical structures with forking functions and details are not described herein.

In the process of grabbing the item, the item grabbing apparatus 504 may adjust a posture based on an actual need. Referring to FIG. 6, according to an implementation mode of an embodiment of the present application, the carrying device further includes a rotating component 505, and the item grabbing apparatus 504 is disposed on the rotating component 505. The item grabbing apparatus 504 through the rotating component 505 may face towards a preset direction, such as facing towards the containing apparatus 503 or the item storage apparatus. For example, in the sorting scenario, through the rotating component 505 the item grabbing apparatus 504 faces towards the item storage apparatus and grabs the item from the item storage apparatus, and then through the rotating component 505 the item grabbing apparatus 504 faces towards the containing apparatus 503 and places the grabbed item at any containing position of the containing apparatus 503 such as in any interlayer. Each interlayer may contain one or more items.

According to an implementation mode of an embodiment of the present application, the lifting component and the rotating component 505 are automatically adjusted to a posture that matches with grabbing the target item during the carrying device moving from a task starting point to the preset position. In this way, the carrying device is enabled to automatically adjust the posture well before grabbing the target item, thereby reducing the time for grabbing the target item.

As an example, when picking up the target item (e.g., goods), the carrying device travels to a preset position by scheduling. in the process of travelling, the rotating component 505 and the lifting component cooperate to rotate the rack on the carrying device by 90°. The rotating direction of the rack depends on the position direction of the grabbed goods, and the lifting or lowering height of the lifting component depends on the position height of the grabbed goods. Then the telescopic component works. The telescopic component extends to make the clamping portion be extended to a position corresponding and coupled to a material box storing the grabbed goods, and then the clamping portion clamps the material box storing the goods. Then the lifting component works and lifts the material box storing the goods. The telescopic component works and quickly places the item in the interlayer of the rack at a corresponding height of the goods. The carrying device receives a system instruction and goes to a next position. During the travelling process of the carrying device, the rotating component 505 works at the same time, so that the forward direction of the rack is aligned with that of the carrying device. Then, one or more components work and place the material box storing the goods in the interlayer of the rack scheduled by the system, during which the carrying device is on the way to the next pick-up site.

The item grabbing apparatus 104 provided by the present application may take out two or more target items, place the target items on the item storage apparatus and transport the multiple target items together to the designated site, to maximize the efficiency.

The robot (i.e., carrying device) provided by the embodiment of the present application is automatically transported to the preset destination through the travelling apparatus. The robot can bear and carry the target items grabbed by the item grabbing apparatus by using the containing apparatus (including one or more containing positions) connected to the body of the robot. Compared with the traditional way of carrying the entire rack, the robot may selectively grab a storage container or the goods on the rack to be transported instead of the entire rack, thereby improving the hit rate of the item sorting.

Figure 7:
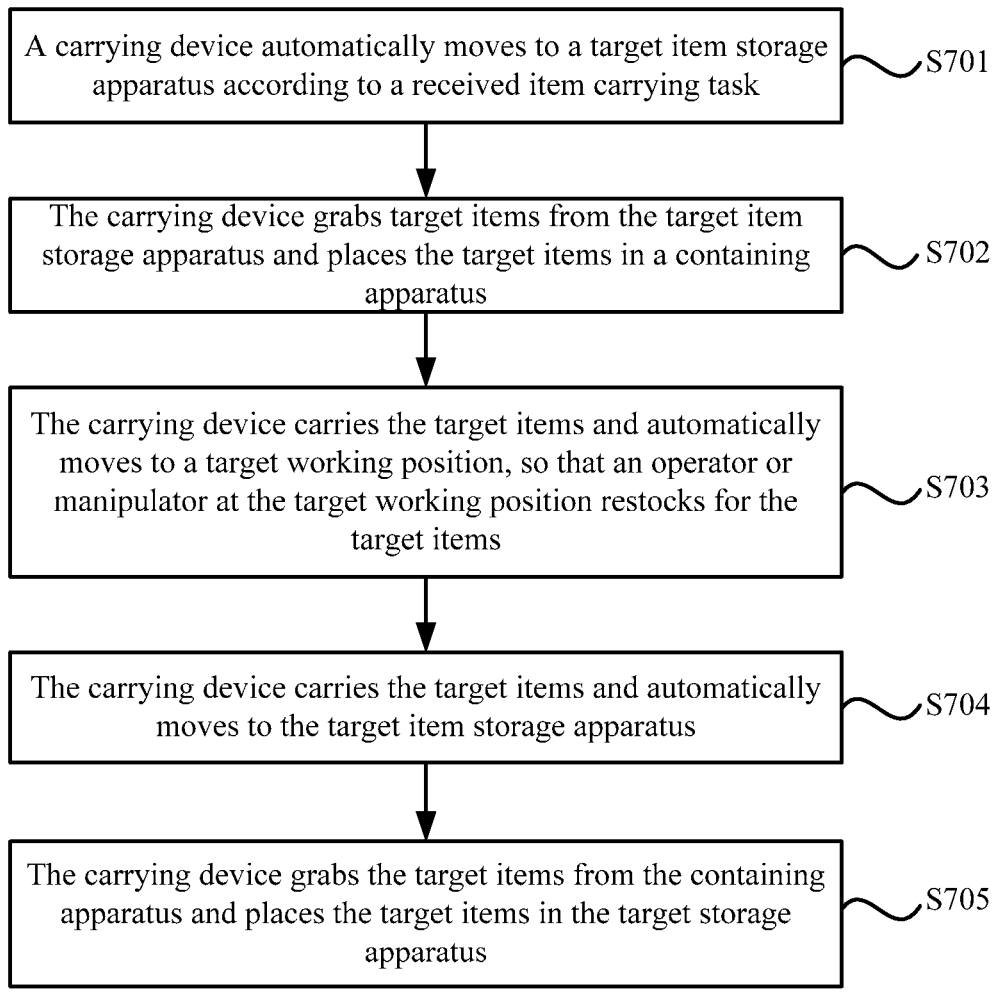
FIG. 7 is a flowchart of a carrying method based on a restocking scenario according to an embodiment of the present application.

Referring to FIG. 7, by using the carrying device (i.e., robot) provided by the above embodiments, an embodiment of the present application provides a restocking method based on a restocking scenario, including steps described below.

In S701, the carrying device automatically moves to a target item storage apparatus according to a received item carrying task.

In S702, the carrying device grabs target items from the target item storage apparatus and places the target items in a containing apparatus.

The target item may be a storage container. The carrying device may communicate with a backend server, and the communication manner may be a wired manner or a wireless manner. By communicating with the backend server, the carrying device can obtain an item carrying task including a travelling path (including one or more coordinate points) allocated to the carrying device and a specific ID identifier of a target item (such as a serial number of an item, etc.). According to the ID identifier of the target item, the carrying device identifies a target item to be grabbed from the target item storage apparatus and grabs the target item. In addition, each interlayer of the target item storage apparatus may be respectively provided with an interlayer ID identifier. According to the interlayer ID identifier, the carrying device may further determine which interlayer of the target item storage apparatus the height of the item grabbing apparatus reaches, thereby grabbing the target item from the preset interlayer of the target item storage apparatus. In this case, the item carrying task further includes the interlayer ID identifier.

The containing apparatus of the carrying device carries the target item. The containing apparatus includes multiple containing positions that are interlayers stacked in a vertical direction. Each of the interlayers may contain at least one target item. Each interlayer of the containing apparatus may also be respectively provided with the interlayer ID identifier. Through the interlayer ID identifier, the carrying device may determine which interlayer of the containing apparatus the height of the item grabbing apparatus reaches, thereby placing the target item in the preset interlayer of the containing apparatus.

In S703, the carrying device carries the target items and automatically moves to a target working position, so that an operator or manipulator at the target working position restocks for the target items.

At the target working position, the operator or manipulator places goods into the target items, where the goods are goods for restocking in the target item storage apparatus.

In S704, the carrying device carries the target items and automatically moves to the target item storage apparatus.

In S705, the carrying device grabs the target items from the containing apparatus and places the target items in the target storage apparatus.

As a situation, an item carrying task received by the carrying device may include carrying multiple target items, and the carrying device obtains multiple target items from one or more item storage apparatuses by planning a path.

It should be understood that, in addition to the restocking scenario, the carrying device of the embodiment of the present application may also be applied to a sorting method in the sorting scenario. In S703, the operator or manipulator grabs the goods from the target items, and the goods is goods to be sorted. The grabbed goods may be placed in one order container. The goods in the one order container may be goods of an order.

That the carrying device moves to the target working position may be realized by the following manners: a. if there are target items in the target item storage apparatus, the carrying device grabs one or more target items from the target item storage apparatus and then moves to the target working position; b. if there are target items in the target working position, the carrying device grabs part of the target items from the target item storage apparatus (there are target items in the target item storage apparatus) or carries no item (there is no target item in the target item storage apparatus) and then moves to the target working position. The target item may be a storage container. The storage container may be any component for placing the goods, such as a package box, a package bag or a container.

After arriving at a designated position, that the carrying device, a person, places the goods into the target items may be realized by the following manners: a. if the carrying device carries all or part of the target items, the operators, operating robot (a variety of operating robots such as a parallel robot, a 6-degree-of-freedom (6-dof) manipulator, etc.) or another automation device places the goods into the target items; b. if the carrying device does not carry the target items or a part of the carrying device does not carry the target items, the operator, operating robot (a variety of operating robots such as a parallel robot, a 6-dof manipulator, etc.) or another automation device stores the goods into a target item and places the target item at an containing position of the containing container.

Figure 8:
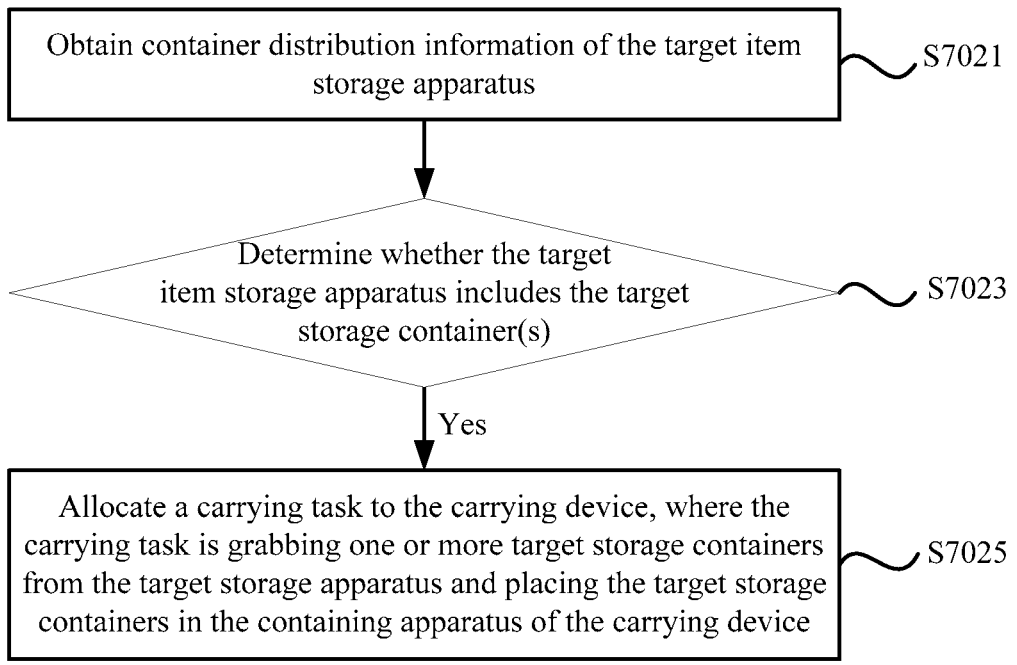
FIG. 8 is a flowchart of a method for allocating a corresponding storage container to a robot according to an embodiment of the present application.

During the implementation of the S702, Referring to FIG. 8, according to an implementation mode of an embodiment of the present application, during the implementation of the S702, the backend server allocates corresponding container carrying policies to the carrying device based on a container distribution status of the target working position and the target item storage apparatus, which may include the steps described below.

In S7021, container distribution information of the target item storage apparatus is obtained.

The storage container may be provided with a serial number (such as a quick response (QR) code or a barcode), a label (such as a radio frequency identification (RFID) label) or the like. The serial numbers or labels of the storage containers may be correspondingly read through a camera or a label sensing so as to obtain the distribution information (such as the type, the number, etc., of the storage container) of the storage containers in the target item storage apparatus.

In S7023, whether the target item storage apparatus includes the target storage container(s) is determined.

The backend server obtains the number of the remaining storage containers by querying information about the serial numbers of the storage containers, so as to determine whether the target item storage apparatus includes the target storage container(s).

In S7025, if the target item storage apparatus includes the target storage container(s), a carrying task is allocated to the carrying device. The carrying task is grabbing one or more target storage containers from the target item storage apparatus and placing the target storage containers in the containing apparatus of the carrying device.

When the backend server queries that the target item storage apparatus includes the target storage container(s), the serial number(s) of the target storage container(s) may be carried in the carrying task allocated to the carrying device. Then the carrying device may automatically move to the target item storage apparatus, identify the target storage container(s) according to the serial number(s) and automatically place the target storage container(s) in the containing apparatus of the carrying device.

Through the multiple steps described above, the carrying device can automatically select and carry the storage container to the target working position, and operating objects (manipulators, manpower, etc.) at the target working position may then directly place the goods in the storage container, which improves the efficiency of putting the goods on racks.

Figure 9:
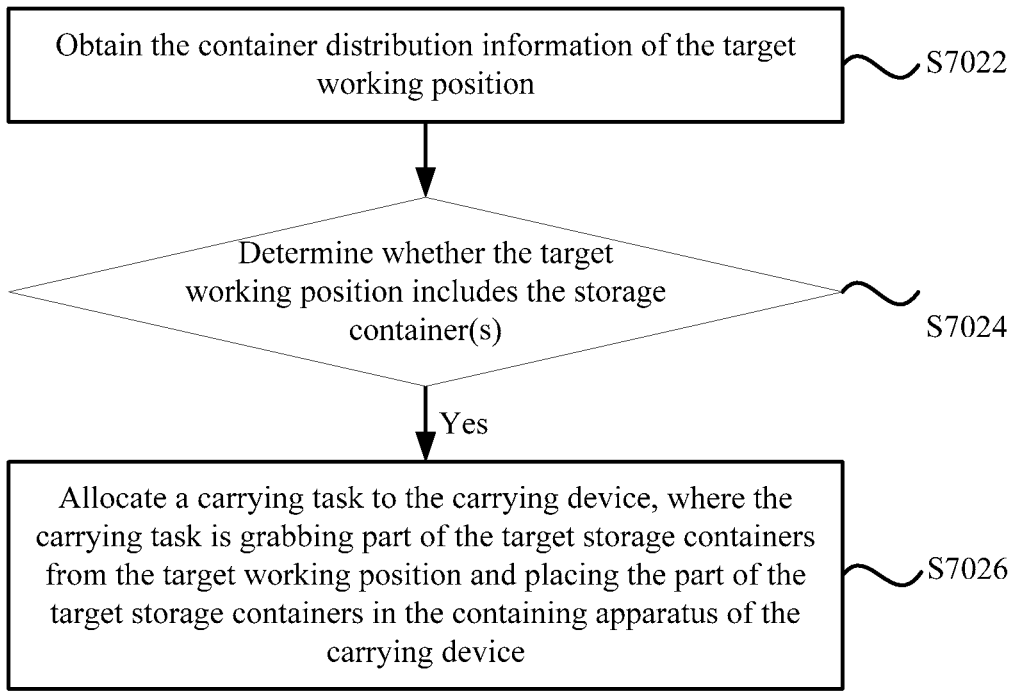
FIG. 9 is a flowchart of another method for allocating a corresponding storage container to a robot according to an embodiment of the present application.

Referring to FIG. 9, during the implementation of the S702, according to another implementation mode of an embodiment of the present application, the step of allocating corresponding container carrying policies to the carrying device based on the container distribution status of the target working position and the target item storage apparatus includes the steps described below.

In S7022, the container distribution information of the target working position is obtained. The storage container may be provided with a serial number (such as a QR code or a barcode), a label (such as a RFID label) or the like. The serial numbers or labels of the storage containers may be correspondingly read through a camera or a label sensing so as to obtain the distribution information (such as the type, the number, etc., of the storage container) of the storage containers at the target working position.

In S7024, whether the target working position includes the storage container(s) is determined.

The backend server obtains the number of the remaining storage containers by querying information about the serial numbers of the storage containers, so as to determine whether the target working position includes the target storage container(s).

In S7026, if the target working position includes the target storage container(s), a carrying task is allocated to the carrying device. The carrying task is grabbing part of the target storage containers from the target working position and placing the part of the target storage containers in the containing apparatus of the carrying device.

Alternatively, the carrying task may also be no load on the carrying device. Since the target working position already has the part of the storage containers, as a case, the goods in the storage containers at the target working position may be consumed first, and at this time, the carrying device may be controlled to contain and carry another part of the storage containers or be controlled not to carry the storage containers in no-load. After the goods in all the storage containers at the target working position is consumed, the storage containers are carried and the restocking with the goods on the rack is carried out by executing S702-S705.

Through the above steps, the storage containers at the target working position can be first consumed, which improves the use efficiency of the storage containers.

The carrying device (i.e., robot) has the function of moving the target item up and down. To facilitate the operation for sorting or restocking goods, the carrying device may move the target item to the height of the interlayer where the operation is convenient, and the operator, the operating robot (such as a parallel robot, a 6-dot robot, etc.) or other automation devices may make the restocking or sorting of the target item relatively convenient.

The carrying device may place the target item at a fixed position, and the operator, the operating robot or another automation device sorts or restocks goods at the fixed position.

The carrying device may take the target items from the containing apparatus and place the target items on a transfer device such as a transmission line. The operators, the operating robots or other automated devices sort or restock the target items on the transfer device such as the transmission line; or the operators, the operating robots or other automation devices take the target items from the transfer device such as the transmission line and carry out the sorting or restocking, then the target items are put back to the transfer device such as the transmission line after the sorting or restocking is finished, and finally, the carrying device grabs the target items after being sorted or restocked, on the transfer device such as the transmission line.

The target items, the goods corresponding to the target items, and part or all of the target items are performed information binding with the containing positions of the carrying device to form corresponding information. The corresponding information is stored in the backend server, the carrying device or a database, thereby forming basic information used for subsequent operations.

An item including at least one of the following conditions is placed in an item storage apparatus that is closer to the working position: a high heat or large shipments. An item including at least one of the following conditions is placed in an item storage apparatus that is farther from the working position: a low heat or low shipments. Thus, the carrying distance of the carrying device is reduced. Items with high probability of pairwise occurrence may be placed in adjacent item storage apparatuses, thereby increasing the probability of pairwise hit rate in future shipments. The sorting efficiency can be improved by reducing the travelling distance of the carrying device.

Figure 10:
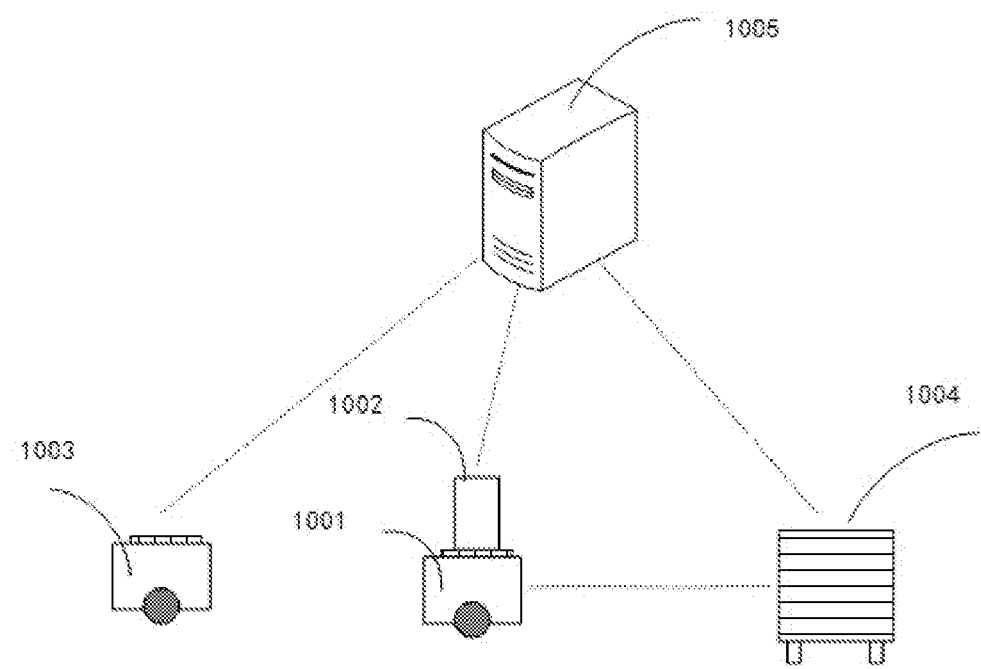
FIG. 10 is a schematic diagram of a carrying system based on a storage container and a temporary rack according to an embodiment of the present application.

Referring to FIG. 10, an embodiment of the present application provides a carrying system based on a storage container and a temporary rack, including: a first robot 1001, a storage container 1002, a second robot 1003, a temporary rack 1004 and a control server 1005.

The storage container 1002 is configured to store items to be sorted or to be restocked. The storage container 1002 may be, for example, a carton, a turnover box, or a custom container that may be adapted for robot operations. The storage container 1002 can be placed on the temporary rack 1004 or a carrier apparatus (e.g., a conveyor belt) and may store one or more items. In an embodiment, the temporary rack 1004 may be understood as a temporary cache apparatus.

The first robot 1001 may communicate with the control server 1005. By the communication connection with the control server 1005, the first robot 1001 can obtain a form content. The form content may be an order of the items to be sorted according to the user's requirement. The form may contain one or more different types of items (e.g., items to be sorted), and the items to be sorted on the same form are to be packaged by one or more appliances. The items corresponding to the form are usually placed in the storage container 1002. After obtaining the form content, the first robot 1001 can grab the storage container 1002 related to the items in the form from a storage rack. In an embodiment, the storage rack may be understood as an item storage apparatus.

The temporary rack 1004 may store one or more storage containers. For example, the temporary rack 1004 includes multiple interlayers stacked in a vertical direction, and each interlayer may contain at least one storage container 1002. In a sorting scenario, the temporary rack 1004 is configured to store the storage container 1002 that the first robot 1001 takes out from the storage rack, and the items in the storage container 1002 are items to be sorted. In a restocking scenario, the temporary rack 1004 stores storage containers 1002 that are restocked to the storage rack, and the items in the storage container 1002 are items to be restocked. The temporary rack 1004 corresponds to the form. One form may correspond to one or more temporary racks 1004, or one or more forms may correspond to one temporary rack 1004.

The temporary rack 1004 may or may not have wheels. If the temporary rack 1004 has no wheels, the temporary rack 1004 is disposed on the second robot 1003. If the temporary rack 1004 has wheels, the second robot 1003 may drag the temporary rack with wheels.

By setting the temporary rack, the items related to the form can be placed directly in a collection. In this way, all the storage containers on the temporary rack 1004 are objects to be sorted. After the temporary rack 1004 is transported to a designated place (such as a workbench), the efficiency of item sorting is greatly improved.

The second robot 1003 moves along with the first robot 1001 and carries the temporary rack during the following process. The first robot 1001 moves according to a navigation path, and the second robot 1003 may automatically track the first robot 1001 based on the lidar target tracking technology. The second robot 1003 follows the first robot 1001 wherever the first robot 1001 goes. Or, the first robot 1001 and the second robot 1003 respectively move according to the same navigation path. Of course, the final position of the navigation path of the first robot 1001 is not exactly the same as, but adjacent to, the final position of the navigation path of the second robot 1003.

Any navigation mode may be used for navigation by the first robot 1001 and the second robot 1003, such as QR code visual navigation, inertial navigation, simultaneous localization and mapping (SALM) navigation, line patrol navigation, etc. Or any combination of the above multiple navigation modes may also be used for navigation, such as a combination of QR code visual navigation and inertial navigation or a combination of QR code visual navigation and SLAM navigation, etc. The technical solution of the embodiment of the present application does not specifically limit the navigation mode.

For simplicity, FIG. 10 only shows one first robot 1001 and one second robot 1002. The carrying system may include any suitable number of first robots 1001 and second robots 1002. For example, multiple second robots 1003 follow one first robot 1001, or one second robot 1003 follows multiple first robots 1001.

Figure 11:
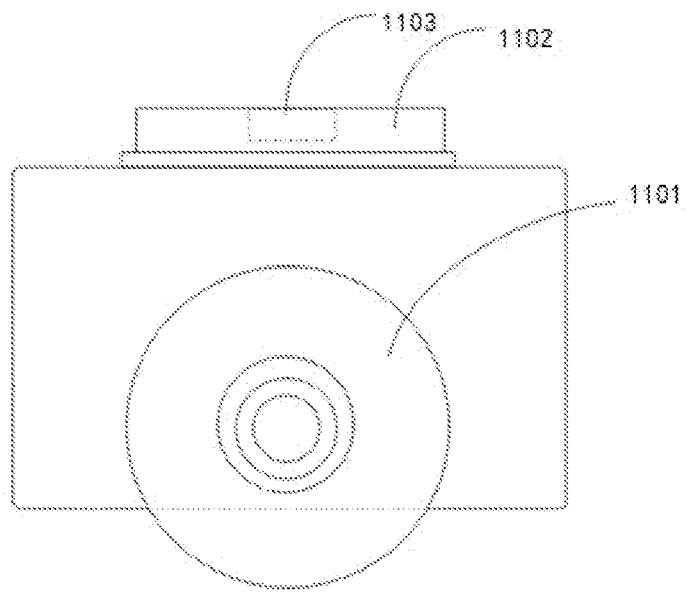
FIG. 11 is a structural diagram of a second robot according to an embodiment of the present application.

Referring to FIG. 11, the second robot 1003 may include a driving mechanism 1101 through which the second robot 1003 can move in the workspace. The second robot 1003 may further include a lifting mechanism 1102 configured to carry the temporary rack. When the lifting mechanism 1102 is raised, the temporary rack is lifted off the ground in order to enable the second robot 1003 to carry the temporary rack 1002, and when the lifting mechanism 1102 is lowered, the temporary rack 1002 is placed on the ground. In an embodiment, the lifting mechanism 1102 is optional, that is, the second robot 1003 may not include the lifting mechanism 1102, and the temporary rack 1002 is placed on the body of the second robot 1003. A target identification component 1103 of the second robot 1003 can effectively identify the temporary rack 1002 when the second robot 1003 lifts the temporary rack 1002.

In addition, if the second robot 1003 is based on the visual navigation, the second robot 1003 further includes a navigation identification component (not shown in FIG. 11) configured to identify navigation marks (such as QR codes)

laid on the ground. In an embodiment, the second robot 1003 further includes a control module (not shown in FIG. 11) that controls the entire second robot 1003 to implement functions such as motion, navigation, and the like. The second robot 1003 may also include a tracking mechanism (not shown in FIG. 11), for example, the tracking mechanism may track the first robot 1001 based on the lidar target tracking technology.

Figure 12:
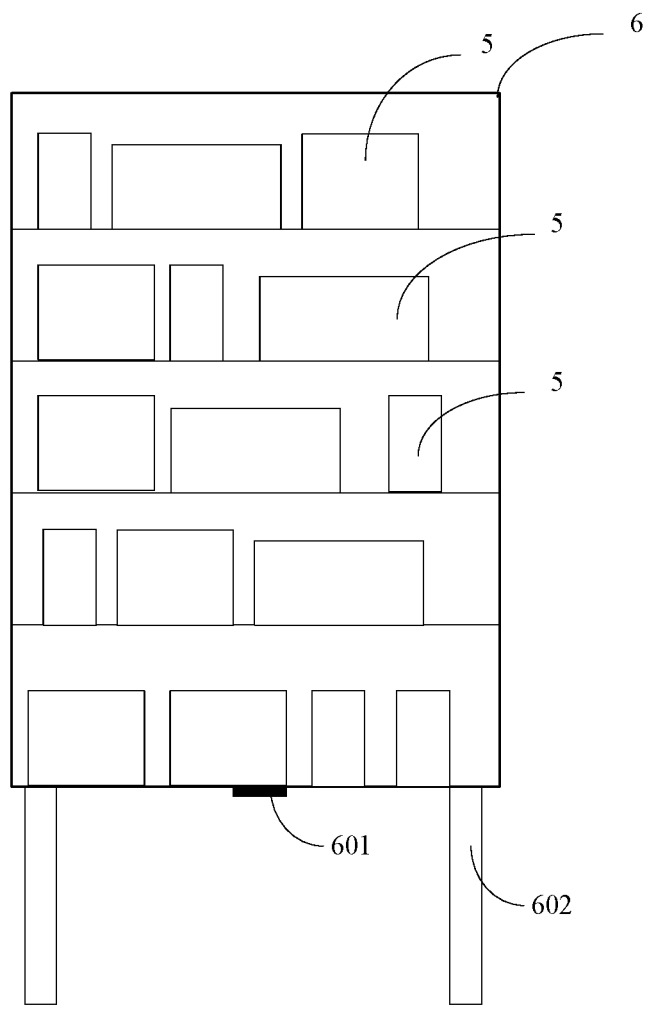
FIG. 12 is a structural diagram of a storage rack according to an embodiment of the present application.

FIG. 12 is a schematic diagram of a storage rack 6 according to an embodiment of the present application. The storage rack 6 stores items 60. Of course, the items 60 may also be stored in the storage container(s). In an embodiment, the storage rack 6 includes multiple interlayers stacked in the vertical direction, and each interlayer can contain multiple items 60. The storage rack 6 includes one or more supporting portions 602.

In an embodiment, the item 60 may also be hung on a hook or a rod in the storage rack 6 or on the storage rack 6. The item 60 can be placed on an inner or outer surface of the storage rack 6 in any appropriate manner.

In order to facilitate the first robot 1001 selecting the storage container(s) on the storage rack 6, each interlayer on the storage rack 6 is provided with a marking point (not shown in FIG. 12) for identifying the interlayer, and according to the marking point the first robot 1001 determines which interlayer the grabbing apparatus is lifted to.

A storage relationship between the temporary rack 1004 and the storage container may also be seen in FIG. 12. The temporary rack 1004 can be dragged, carried or moved in other manners by the second robot 1003. In order to facilitate the temporary rack 1004 to be lifted by the second robot 1003, the bottom of the temporary rack is provided with a rack identifier 601. After identifying the temporary rack 1004 according to the rack identifier 601, the second robot 1003 lifts the temporary rack 1004 through the lifting mechanism and transports the temporary rack 1004 away.

The item represents any item stored, sorted or transported in at least one of an automatic inventory, a warehouse, or a manufacturing and parts processing system. The item may be any materials. The item may be a living or inanimate object. As an example, the item may denote an item of a commodity stored in the warehouse.

The first robot 1001 may designate a temporary rack 1004 which includes the specific item that is associated with a customer order to be packaged, so as to deliver to the customer or other parties.

As another example, the item may represent a luggage stored in a luggage facility of an airport. The first robot 1001 may take back the temporary rack 1002 including the luggage to be transported or tracked, which may include selecting a specific luggage item used for an explosive screening, moving a luggage item associated with a flight that has converted the gate, or removing a luggage item belonging to a passenger who has missed the flight.

As another example, the item may denote multiple components of a manufacturing toolkit. In an embodiment, these components may denote components which are planned to be included in an assembled product, such as computer components used for customizing a computer system. In such an embodiment, the first robot 1001 may retrieve the specific components identified by specifications related to the customer order.

As another example, the item may represent a person. For example, in a hospital environment, the temporary rack 1004 may denote a bed for a specific patient. Therefore, the item storage system may be configured to provide a safe and effective system used for moving the hospital bed, which limits the probability of patient injury and reduces the probability of errors due to human errors. In short, the item may be any appropriate item suitable for being stored in the temporary rack in any appropriate manner.

In operation, the first robot 1001 and the second robot 1003 can move between points within the workspace associated with the item storage system, and the second robot 1003 can carry the temporary racks 1004 between positions within the workspace. Based on the received command, the first robot 1001 may determine a movement destination of the first robot 1001. For example, in an embodiment, the first robot 1001 may receive and identify the destination information and intermediate path information of the first robot 1001 from an administrator or a management apparatus (such as the control server 1005) of the item storage system. The first robot 1001 may receive information via a wireless interface, a wired connection, or any other suitable component, so as to facilitate communication with an operator or a management apparatus of the item storage system. In general, the first robot 1001 can be controlled, in whole or in part, to any desired place based on a command from the control management apparatus or the operator.

As an example, the rest of the specification assumes that the first robot 1001 receives wirelessly commands, data, instructions or information constructed in any appropriate manner. These commands are used for identifying specific temporary racks 1004 in order to facilitate the first robot 1001 and the second robot 1003 to move to the destination and to facilitate the second robot 1003 to carry the temporary rack 1004. The second robot 1003 may move the first robot 1001, the temporary rack 1004, or a combination of the first robot 1001 and the temporary rack 1004 through motors or wheels of a driving module 1101.

Figure 13:
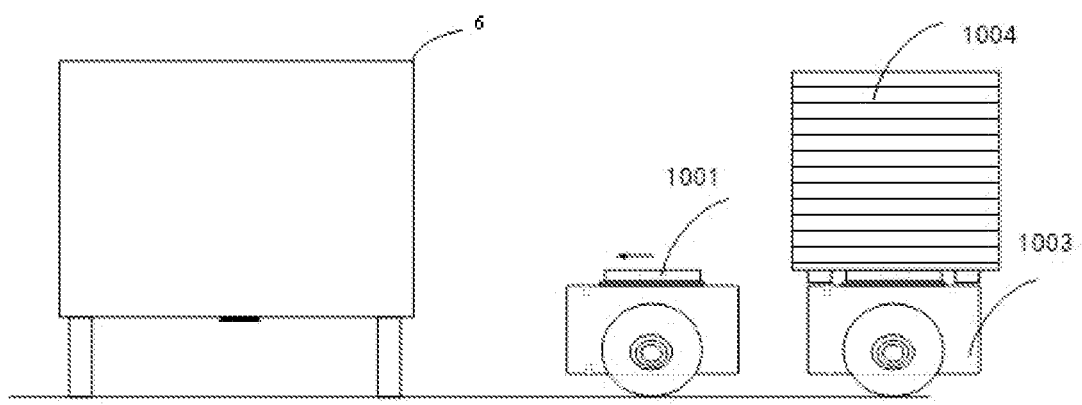
FIG. 13 is a schematic diagram of a first robot approaching a storage rack according to an embodiment of the present application.

In response to the received command, the first robot 1001 moves to the designated storage position (see FIG. 13), such as moving to a storage rack 6, and the second robot 1003 carries the temporary racks 1004 and moves to the storage rack 6 along with the first robot 1001.

The first robot can automatically select storage containers located on the storage rack 6 or on the temporary rack 1004. As an example, the first robot 1001 is provided with a selection apparatus which can adjust a selection direction in a rotating manner so that the selection apparatus faces towards the storage rack or the temporary rack.

In addition to automatically selecting the storage containers on the racks (including the storage rack 6 and the temporary rack 1004) by the first robot 1001, for storage containers which have been stored on the racks, the selection apparatus can also adjust the height for grabbing to allow that the grabbing apparatus grabs a storage container in any interlayer of the storage rack or the temporary rack and places the storage container in any interlayer of the storage rack or the temporary rack.

Figure 14:
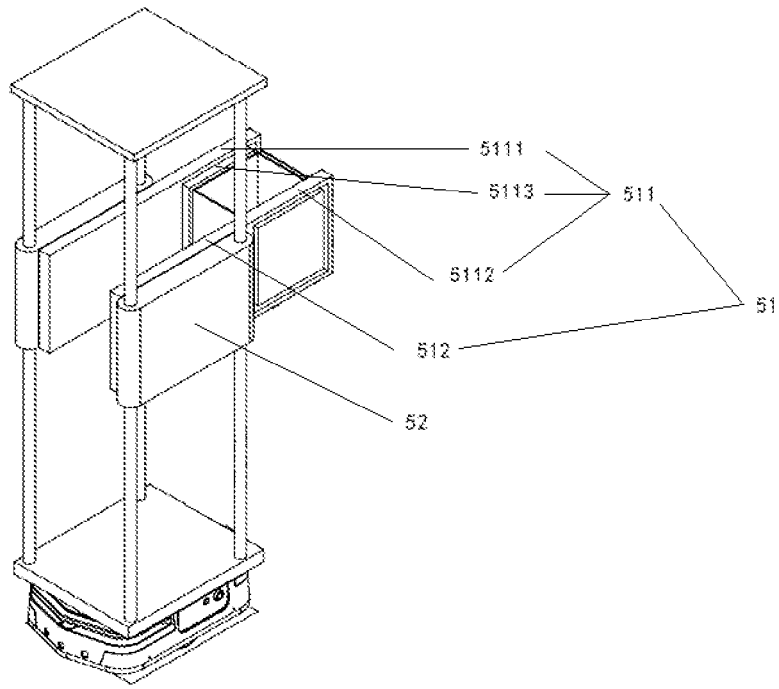
FIG. 14 is a structural diagram of a first robot according to an embodiment of the present application.

Referring to FIG. 14, FIG. 14 is a schematic diagram of a first robot according to an embodiment of the present application. The first robot is provided with a grabbing apparatus. The grabbing apparatus includes a telescoping component 51 configured to grab a storage container. The grabbing apparatus further includes a lifting component 52 that lifts or lowers the telescopic component 51 to a preset height.

In an embodiment, the telescopic component 51 includes a clamping portion 511 and a sliding portion 512. The clamping portion 511 grabs, in a clamping manner, the storage container from a temporary rack or a storage rack. The clamping portion 511 is slidably connected to the sliding portion 512, and slides in a depth direction of interlayers of the rack through the sliding portion 512.

In an embodiment, the clamping portion 511 includes a first gripper 5111 and a second gripper 5112 which are relatively disposed on a left side and a right side of the interlayers. The first gripper and the second gripper may be in a plate like structure. As shown in FIG. 14, the two grippers may be other structures, such as in a rod-shaped structure.

In an embodiment, the clamping portion 511 further includes non-slip mats 5113 respectively disposed on an inner side of the first gripper 5111 and an inner side of the second gripper 5112. The non-slip mats 5113 are foldable. The non-slip mats 5113 are folded when the clamping portion 511 does not grab the storage container, and the non-slip mats 5113 are opened when the clamping portion 511 grabs the storage container.

In an embodiment, a height of the first gripper 5111 and the second gripper 5112 in a vertical direction matches with a height of an interlayer of the rack so that the first gripper 5111 and the second gripper 5112 may go deep into the interlayer of the rack to grab the storage container in the interlayer.

In an embodiment, the sliding portion 512 is a guide rail and the lifting component 52 is a linear bearing.

The storage container is a separate item storage unit. In order to facilitate the first robot 1001 to know the position of the storage container, the storage container is provided with a container identifier. The container identifier may be a QR code or other graphic marks similar to the QR code, or may also be an RFID or other RFID-like electronic tags with a wireless transmission function. The first robot 1001 identifies the target storage container through the container identifier, and then performs a corresponding grabbing operation on the target storage container.

After the temporary rack 1002 stores all the storage containers corresponding to the form or after the temporary rack is full, the second robot 1003 moves to the preset position by itself according to the navigation path. The preset position may be designated by an operator in the system or may be determined by a control server 1005.

In the carrying system provided by the embodiment of the present application, the first robot may selectively grab a certain storage container on the rack to be carried instead of the entire rack, thereby improving the hit rate of the item sorting. Moreover, the grabbed storage container is placed on the temporary rack which is carried or dragged by the second robot, so as to enable the first robot to select multiple storage containers at one time and make the second robot carry or drag them to the designated position, which improves the carrying efficiency of the storage containers.

Figure 15:
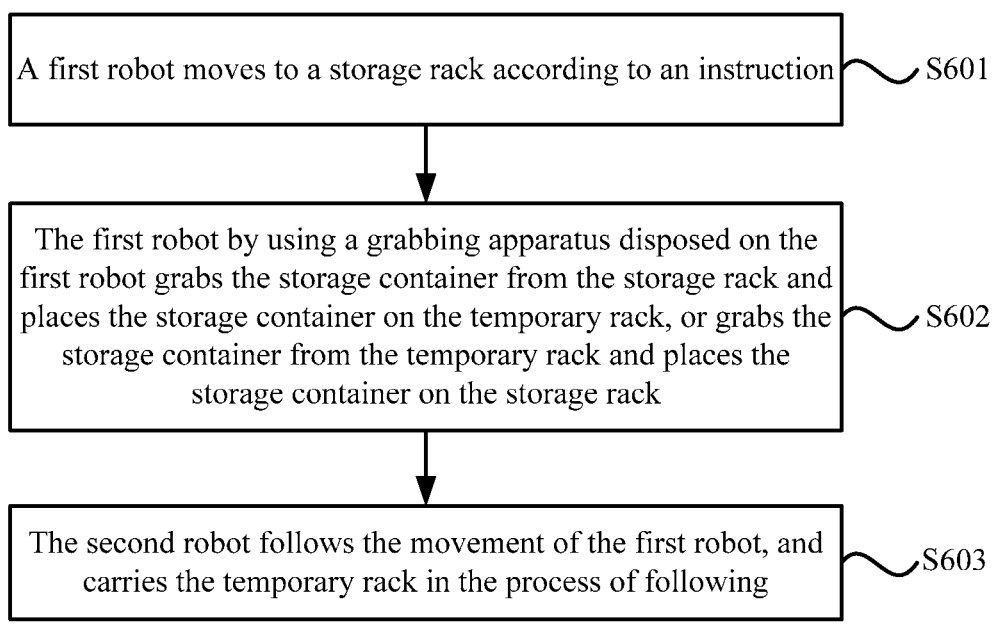
FIG. 15 is a flowchart of a carrying method based on a storage container and a temporary rack according to an embodiment of the present application.

Referring to FIG. 15, an embodiment of the present application further provides a carrying method based on a storage container and a temporary rack, including steps described below.

In S601, a first robot moves to a storage rack according to an instruction.

In S602, the first robot by using a grabbing apparatus disposed on the first robot grabs the storage container from the storage rack and places the storage container on the temporary rack, or grabs the storage container from the temporary rack and places the storage container on the storage rack.

For example, the second robot which moves along with the first robot moves to the storage rack following the first robot, where the second robot is connected with the temporary rack.

In an embodiment, the first robot faces towards the storage rack and adjusts a height of the grabbing apparatus to a height of an interlayer, in which a designated storage container is located, of the storage rack. The first robot grabs the designated storage container from the storage rack by using the grabbing apparatus. The first robot faces towards the temporary rack and adjusts the height of the grabbing apparatus to the height of a designated interlayer of the temporary rack. The first robot places the designated storage container on the designated interlayer of the temporary rack by using the grabbing apparatus.

In an embodiment, the first robot faces towards the temporary rack and adjusts the height of the grabbing apparatus to a height of an interlayer, in which a designated storage container is located, of the temporary rack. The first robot grabs the designated storage container from the temporary rack by using the grabbing apparatus. The first robot faces towards the storage rack and adjusts the height of the grabbing apparatus to the height of a designated interlayer of the storage rack. The first robot places the designated storage container on the designated interlayer of the storage rack by using the grabbing apparatus.

In S603, the second robot follows the movement of the first robot, and carries the temporary rack in the process of following.

For example, in S603, the first robot grabs a first storage container from the storage rack and places the first storage container on the temporary rack or grabs a second storage container from the temporary rack and places the second storage container on the storage rack.

In the process of implementing S601~S603, the storage container is configured to store items to be sorted or items to be restocked. The storage container may be such as a carton, a turnover box, or a custom container that may be adaptive for robot operations. The storage container can be placed on the temporary rack or the storage rack and may store one or more items.

The first robot 1001 may communicate with the control server 1005, and the first robot 1001 can obtain the form content by the communication connection with the control server 1005. The form content may be an order of the items to be sorted according to the user's requirements. The form may contain multiple different types of items (to be sorted), and the items to be sorted on the same form are to be packaged by one or more appliances. The items corresponding to the form are usually placed using the storage container 1004. After obtaining the form content, the first robot 1001 can grab from a storage rack the storage container 1004 related to the items in the form.

When the first robot 1001 grabs the storage container from the storage rack and places the storage container on the temporary rack (corresponding to a sorting scenario) or grabs the storage container from the temporary rack and places the storage container on the storage rack (corresponding to a restocking scenario), the first robot 1001 may place the storage container in accordance with placement methods described below.

i. The first robot places the storage container at a position where an operating route is the shortest. Taking placing the storage container grabbed from the storage rack to the temporary rack as an example, the storage container is placed in an interlayer of the temporary rack which is closest to a height of an interlayer, where the storage container is located, of the storage rack, and the operating route is the shortest for the first robot. The height of the interlayer of the storage rack may be the same as the height of the interlayer of the temporary rack.

ii. The first robot randomly places the storage container at any position.

iii. According to the information about the multiple storage containers to be grabbed by the first robot, each storage container is allocated a position on the temporary rack. For example, a first taken-out storage container is placed on the first floor of the temporary rack (the bottom layer or the top layer), and other taken-out storage containers are placed in the same way.

iv. According to the form or commodity information corresponding to the storage container that the first robot is to grab, a position on the temporary rack is allocated to the storage container, and the position is a position which is most suitable for a sorting at the workstation.

v. According to unloading device information corresponding to the storage container that the first robot is to grab, a position on the temporary rack is allocated to the storage container, and the position is a position which is most suitable for unloading by the unloading device.

vi. According to attributes of the storage container itself, such as size or weight information, a position on the temporary rack is allocated to the storage container, and the position is a position which best matches the attributes of the storage container itself.

Of course, if the placement position, which is selected for the storage container according to any of the above manners, is occupied, the first robot adjusts the position of the storage container on the temporary rack or the storage rack, and an adjustment method includes the following.

i. The first robot uses a take-out apparatus to take out the storage container, adjust the position, and put the storage container at a new position.

ii. The first robot may adjust the position of the storage container either in situ or in the process of travelling.

When the first robot completes the operation of sorting up the storage containers, or the storage positions on the temporary rack are full of storage containers, the temporary rack is moved by the second robot to the position of the workstation for performing an operation on the storage containers.

The operation on the storage containers may be taking out or placing in corresponding goods by an operator or a manipulator, may also be taking out a storage container by an operator or a manipulator and then transferring or transporting the storage container, or may further be taking out the storage container by a take-out device of the first robot and placing the storage container at a designated position (such as another rack or transport device).

By using the carrying method provided by the embodiments of the present application, the first robot may selectively grab a storage container on the rack to be carried instead of the entire rack, thereby improving the hit rate of the item sorting. Moreover, the grabbed storage container is placed on the temporary rack which is carried or dragged by the second robot, so that multiple storage containers may be selected by the first robot at one time and be carried or dragged to the designated position by the second robot at one time, which improves the carrying efficiency of the storage containers.

By using the robot, the carrying system and method provided by embodiments of the present application, the robot is automatically transported to a preset destination through the travelling apparatus, and the target items grabbed by the item grabbing apparatus can be carried and transported by using the containing apparatus (including one or more containing positions) of the robot. Compared with the traditional way of carrying the entire rack, the robot may selectively grab any storage container on the rack to be transported instead of the entire rack, thereby improving the hit rate of the item sorting and improving the carrying efficiency of the storage container.

In an embodiment, the term "a/an" is understood to mean "at least one" or "one or more", that is, in an embodiment, the number of an element may be one, while in other embodiments, the number of the element may be multiple. Thus, "a/an" cannot be construed as a limitation to the number.

Although ordinal numbers such as "first", "second", etc., are used to describe various components, those components are not limited herein. This term is only used to distinguish one component from another. For example, a first component could be referred to as a second component, and similarly, a second component could also be referred to as a first component.

What is claimed is:

1. A robot, comprising:
    a travelling apparatus, disposed at a bottom of the robot and configured to automatically travel to a preset position based on a travelling path received by the robot;
    a body, disposed above the travelling apparatus;
    a containing apparatus, connected to the body and comprising a plurality of containing positions which are interlayers stacked in a vertical direction, wherein one of the interlayers may contain at least one target item;
    an item grabbing apparatus, disposed on the body and configured to, based on a task received by the robot, grab at the preset position a first target item from an item storage apparatus and automatically place the first target item at a containing position of the containing apparatus, or grab at the preset position a second target item from the containing position of the containing apparatus and automatically place the second target item in the item storage apparatus; and
    a rotating component, connected to the item grabbing apparatus;
    wherein the item grabbing apparatus comprises a telescopic component and a lifting component, the telescopic component is configured to grab the first target item from the item storage apparatus or grab the second target item from the containing position of the containing apparatus, and the lifting component is connected to the telescopic component and configured to lift or lower the telescopic component to a preset height, and
    wherein the lifting component and the rotating component are configured to automatically adjust to a posture that matches with grabbing the first target item or the second target item in a process of the robot moving from a task starting point to the present position.

2. The robot of claim 1, wherein the telescopic component comprises a clamping portion and a sliding portion, and the clamping portion is slidably connected to the sliding portion;
    the clamping portion is configured to grab the first target item from the item storage apparatus in a clamping manner or grab the second target item from the containing position of the containing apparatus in the clamping manner; and
    the clamping portion slides through the sliding portion in a depth direction of the interlayers.

3. The robot of claim 2, wherein the clamping portion comprises a first gripper and a second gripper which are relatively disposed on a left side and a right side of the interlayers.

4. The robot of claim 3, wherein the first gripper and the second gripper are both plate like structures.

5. The robot of claim 2, wherein the sliding portion is a guide rail.

6. The robot of claim 1, wherein the telescopic component is configured to be in a contraction state when the robot does not execute the task.

7. The robot of claim 1, wherein the containing apparatus connecting to the body comprises: disposing the containing apparatus on the body; and the body is configured to support the containing apparatus and the item grabbing apparatus and the item grabbing apparatus is disposed at a periphery of the containing apparatus;
or
wherein the containing apparatus connecting to the body comprises: slidably disposing the containing apparatus on a side of the body and to be connected to the body.

8. The robot of claim 1, wherein the first target item comprises a storage container for loading goods or goods; and the second target item comprises a storage container for loading goods or goods.

9. A carrying system, comprising a first robot and a second robot, wherein the first robot comprises:
a travelling apparatus, disposed at a bottom of the robot and configured to automatically travel to a preset position based on a travelling path received by the robot;
a body, disposed above the travelling apparatus;
a containing apparatus, connected to the body and comprising a plurality of containing positions which are interlayers stacked in a vertical direction, wherein one of the interlayers may contain at least one target item;
an item grabbing apparatus, disposed on the body and configured to, based on a task received by the robot, grab at the preset position a first target item from an item storage apparatus and automatically place the first target item at a containing position of the containing apparatus, or grab at the preset position a second target item from the containing position of the containing apparatus and automatically place the second target item in the item storage apparatus; and
a rotating component, connected to the item grabbing apparatus;
wherein the item grabbing apparatus comprises a telescopic component and a lifting component, the telescopic component is configured to grab the first target item from the item storage apparatus or grab the second target item from the containing position of the containing apparatus, and the lifting component is connected to the telescopic component and configured to lift or lower the telescopic component to a preset height, and
wherein the lifting component and the rotating component are configured to automatically adjust to a posture that matches with grabbing the first target item or the second target item in a process of the robot moving from a task starting point to the present position,
wherein
the first robot is configured to move to the item storage apparatus, and grab the first target item in the item storage apparatus and place the first target item on a movable temporary cache apparatus or grab the second target item on the movable temporary cache apparatus and place the second target item in the item storage apparatus; and
the second robot is connected to the temporary cache apparatus and moves along with the first robot.

10. The carrying system of claim 9, wherein the temporary cache apparatus is disposed on the second robot or the second robot drags the temporary cache apparatus provided with wheels.

11. The carrying system of claim 9, wherein the first robot moves according to a navigated travelling path, and the second robot automatically follows the first robot based on a lidar target tracking technology;
or the first robot and the second robot move respectively according to the same navigated travelling path.

12. The carrying system of claim 9, wherein the first robot comprises a grabbing apparatus, which is configured to adjust a grabbing height, grab the first target item in any interlayer of the item storage apparatus or the second target item in any interlayer of the temporary cache apparatus, and place the first target item in any interlayer of the temporary cache apparatus or the second target item in any interlayer of the item storage apparatus.

13. The carrying system of claim 12, wherein the grabbing apparatus comprises a telescopic component which is configured to grab the first target item or the second target item.

14. The carrying system of claim 13, wherein
the grabbing apparatus further comprises a lifting component which is connected to the telescopic component and configured to lift or lower the telescopic component to a preset height.

15. The carrying system of claim 13, wherein the telescopic component comprises a clamping portion and a sliding portion, and the clamping portion is slidably connected to the sliding portion; and
the clamping portion is configured to grab, in a clamping manner, the second target item from the temporary cache apparatus or the first target item from the item storage apparatus, wherein the clamping portion slides through the sliding portion in a depth direction of the interlayers of the temporary cache apparatus or the item storage apparatus.

16. The carrying system of claim 15, wherein the clamping portion comprises a first gripper and a second gripper which are relatively disposed on a left side and a right side of the telescopic component.

17. The carrying system of claim 16, wherein the first gripper and the second gripper are both plate like structures.

18. The carrying system of claim 15, wherein the sliding portion is a guide rail.

19. The carrying system of claim 9, wherein the first target item comprises a storage container for loading goods or goods; and the second target item comprises a storage container for loading goods or goods.

20. The carrying system of claim 19, wherein the storage container comprises a container identifier, and wherein the first robot identifies the storage container through the container identifier.

21. A carrying method, comprising:
operating a first robot to move to an item storage apparatus;
operating a second robot, which moves along with the first robot, to move to the item storage apparatus along with the first robot, wherein the second robot is connected to a temporary cache apparatus; and
operating the first robot to grab a first target item from the item storage apparatus and place the first target item on the temporary cache apparatus or to grab a second target item from the temporary cache apparatus and place the second target item on the item storage apparatus,
wherein the first robot comprises:

a travelling apparatus, disposed at a bottom of the robot and configured to automatically travel to a preset position based on a travelling path received by the robot;

a body, disposed above the travelling apparatus;

a containing apparatus, connected to the body and comprising a plurality of containing positions which are interlayers stacked in a vertical direction, wherein one of the interlayers may contain at least one target item;

an item grabbing apparatus, disposed on the body and configured to, based on a task received by the robot, grab at the preset position the first target item from the item storage apparatus and automatically place the first target item at a containing position of the containing apparatus, or grab at the preset position the second target item from the containing position of the containing apparatus and automatically place the second target item in the item storage apparatus; and a rotating component, connected to the item grabbing apparatus;

wherein the item grabbing apparatus comprises a telescopic component and a lifting component, the telescopic component is configured to grab the first target item from the item storage apparatus or grab the second target item from the containing position of the containing apparatus, and the lifting component is connected to the telescopic component and configured to lift or lower the telescopic component to a preset height, and wherein the lifting component and the rotating component are configured to automatically adjust to a posture that matches with grabbing the first target item or the second target item in a process of the robot moving from a task starting point to the present position.

22. The carrying method of claim 21, wherein the operating the first robot to grab the first target item from the item storage apparatus and place the first target item on the temporary cache apparatus comprises: operating the first robot to grab the first target item from the item storage apparatus and place the first target item on the temporary cache apparatus through a grabbing apparatus disposed on the first robot; and wherein the operating the first robot to grab the first target item from the item storage apparatus and place the first target item on the temporary cache apparatus through the grabbing apparatus disposed on the first robot comprises:

operating the first robot to face towards the item storage apparatus and adjust a height of the grabbing apparatus to a height of an interlayer, in which the first target item is located, of the item storage apparatus;

operating the first robot to grab the first target item from the item storage apparatus through the grabbing apparatus;

operating the first robot to face towards the temporary cache apparatus and adjust the height of the grabbing apparatus to a height of a designated interlayer of the temporary cache apparatus; and operating the first robot to place the first target item in the designated interlayer of the temporary cache apparatus through the grabbing apparatus.

* * * * *